United States Patent [19]

Kawashima et al.

[11] Patent Number: 5,302,651
[45] Date of Patent: Apr. 12, 1994

[54] POLYARYLENE SULFIDE RESIN COMPOSITION

[75] Inventors: Kiyotaka Kawashima, Takaishi; Shigeaki Nagano, Izumiohtsu, both of Japan

[73] Assignee: Dainippon Ink and Chemicals, Inc., Tokyo, Japan

[21] Appl. No.: 779,789

[22] Filed: Oct. 21, 1991

[30] Foreign Application Priority Data

Oct. 19, 1990 [JP] Japan .................. 2-279219
Oct. 19, 1990 [JP] Japan .................. 2-279223
Oct. 23, 1990 [JP] Japan .................. 2-284711

[51] Int. Cl.⁵ .............................. C08K 5/09
[52] U.S. Cl. .............................. 524/306; 524/311; 524/609
[58] Field of Search .................. 524/306, 311, 609

[56] References Cited

U.S. PATENT DOCUMENTS

| | | |
|---|---|---|
| 3,274,165 | 9/1966 | Lenz et al. . |
| 3,285,882 | 11/1966 | Pike . |
| 3,303,170 | 2/1967 | Pike . |
| 4,176,098 | 11/1979 | Needham . |
| 4,395,509 | 7/1983 | Blackwell et al. . |
| 4,960,813 | 10/1990 | Wadhwa et al. ............ 524/311 |
| 5,008,316 | 4/1991 | Wadhwa et al. . |
| 5,045,585 | 9/1991 | Bier et al. ............ 524/306 |

FOREIGN PATENT DOCUMENTS

| | | |
|---|---|---|
| 463994 | 3/1950 | Canada . |
| 292275 | 11/1988 | European Pat. Off. . |
| 1-69657 | 3/1989 | Japan . |
| 2-64159 | 3/1990 | Japan . |
| 1213674 | 11/1970 | United Kingdom . |

*Primary Examiner*—John C. Bleutge
*Assistant Examiner*—Mark Sweet
*Attorney, Agent, or Firm*—Armstrong, Westerman, Hattori, McLeland & Naughton

[57] ABSTRACT

A polyarylenesulfide resin composition manufactured by compounding polyarylenesulfide resin with one or more ester-based compounds selected from the groups of compounds shown in the following formulas (1) and (2):

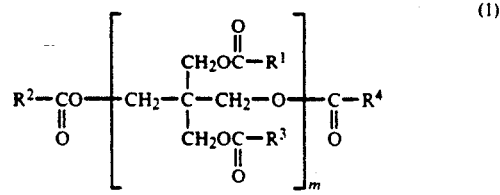

where $R^1$ to $R^4$ are such that at least one of them is an alkyl or alkenyl group of 10–40 carbon atoms, the remaining Rs represent —H, —OH, alkyl, or aryl radicals, and $1.0 < m < 6.0$

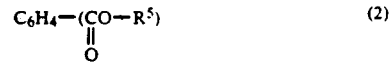

($R^5 = C_nH_{2n+1}$, $40 \leq n \leq 70$.

12 Claims, No Drawings

POLYARYLENE SULFIDE RESIN COMPOSITION

BACKGROUND OF THE INVENTION

1. Field of the Invention

The present invention relates to a polyarylene sulfide (hereinafter "PAS") resin composition that is excellent in moldability and in mechanical properties. More specifically the present invention relates to a PAS resin composition characterized in that the separability of a molding from the metal mold (hereafter referred to as "mold separability") can be drastically improved independently of the mold temperature at the time of injection molding, thereby shortening the molding time and increasing mechanical strength of the molding to provide a wider range of applicable fields. This is accomplished by combining a specified ester-based compound, as a mold separating agent, into PAS resin.

2. Background of the Invention

In recent years, high heat-resistant thermoplastic resin has been in demand as a component material of instruments for electrical, electronic, automobile, and chemical applications. PAS resin may satisfy this need. However, PAS resin occasionally suffers a drawback in that stable and continuous molding becomes difficult, resulting in a slow molding speed (molding cycle) and poor productivity. This problem arises because PAS resin has good affinity with metals and shrinks slightly in the process of solidification from a molten state. On the other hand, many moldings require the use of precise and complicated metal molds, leading to poor mold separability.

In order to overcome these defects related to mold separability, some countermeasures have been taken in which the cavity of a metal mold is sprayed with silicone oil, or PAS resin is added with zinc stearate (Published Unexamined Japan Patent Application No. 54-162752) or fatty acid amide such as N,N'-alkylene bisalkane amide (U.S. Pat. No. 4,395,509).

For this purpose, however, silicone oil, when sprayed into the cavity, exhibits remarkable mold separability but must be sprayed once or more for every few shots. In the case of moldings having a weld part, the oil concentrates on the weld part and deteriorates weld strength, duplicating the problem with PAS resin. In addition, electrical contacts may malfunction because silicone oil attaches to moldings when the moldings are used for electric or electronic parts. Adding zinc stearate or fatty acid amide (such as N,N'-alkylene bisalkane amide) to some degree aids mold separation, but discoloration, lowering of the mechanical strength in moldings, and gas generation due to the low thermal decomposition temperature of the added compounds also result in kneading and molding processes. Generated gas also lowers resin strength at weld parts in moldings.

SUMMARY OF THE INVENTION

The object of the invention is to provide a PAS resin composition that is improved in mold separability and resistant to thermal decomposition, releases only small amounts of gas during the molding process, and has excellent mechanical properties.

Through numerous tests and studies, the inventors have developed this invention by finding that the addition of a compound based on a specific kind of ester to PAS resin can provide a very stable PAS-resin based composition that does not decompose even at the molding temperature of the PAS resin but shows little evolution of gases, no lowering of mechanical properties, a mold separating effect over a very wide range of metal mold temperatures—60° to 160° C.—and, further, superior adhesiveness to other kinds of materials. More specifically, the invention relates to a PAS resin composition that is composed of one or more ester-based compounds selected from the group of compounds shown in the following formulas (1) and (2).

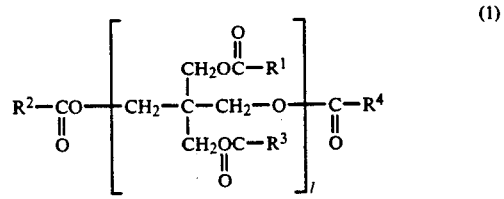

where $R^1$ to $R^4$ are such that at least one of them is an alkyl or alkenyl group of 10-40 carbon atoms and the remaining R's represent —H, —OH, alkyl- or aryl radicals; $1.0 < m < 6.0$

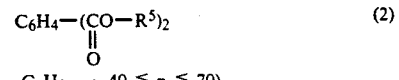

$(R^5 = C_nH_{2n+1}, 40 \leq n \leq 70)$

The PAS resin of this invention includes preferably more than 90 mol % of the structural unit shown below

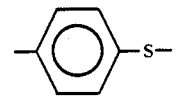

Otherwise, it is difficult to provide a PAS composition having excellent characteristics. Polyphenylene sulfide (PPS) is preferable.

In order to obtain this compound by polymerization, various methods may be enumerated, such a (1) polymerization of p-dichlorobenzene in the presence of sulfur and sodium carbonate or in the presence of sodium hydroxide and sodium sulfide/sodium hydrogen sulfide in a polar solvent; and self-condensation of p-chlorothiophenol. However, the most suitable method is to react sodium sulfide with p-dichlorobenzene in an amide-based solvent such as N-methylpyrrolidone, dimethylacetoamide, or a sulfone-based solvent such as sulfolane. The degree of polymerization is adjusted preferably by adding alkarine metal salts of carboxylic acid/sulfonic acid or adding alkari hydroxide. Copolymer ingredients occupying less than 50 mol %, preferably less than 40 mol % of the whole resin can include a meta bond, 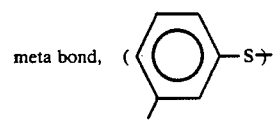

ether bond, 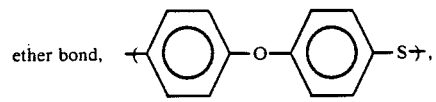

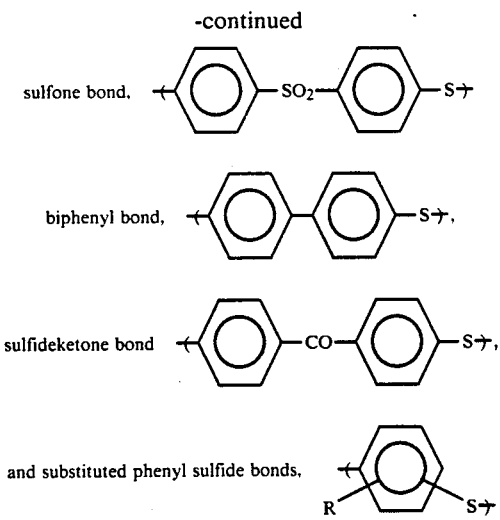

sulfone bond, biphenyl bond, sulfideketone bond and substituted phenyl sulfide bonds, where R represents alkyl-, nitro-, phenyl-, carboxyl radicals, metallic salt radical of carboxylic acid, alkoxy- or amino radicals. In addition, the resin can include preferably less than 5 mol %, preferably 3 mol % of three-functional bonds such as;

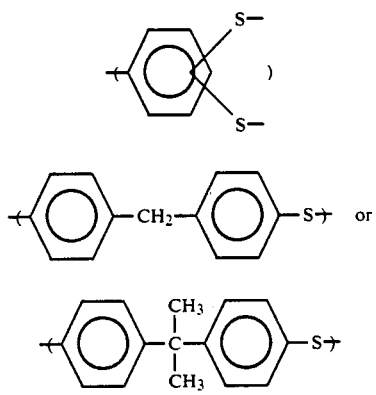

Such PAS resin can be synthesized by general manufacturing methods such as (1): the reaction between a halogen-substituted aromatic compound and alkari sulfide (refer to U.S. Pat. No. 2,513,188, Published Unexamined Japan Patent Application No. 44-27671 and No. 45-3368); (2): the condensation reaction of thiophenols in the presence of alkari catalyst or copper salts (refer to U.S. Pat. No. 3,274,165, UK Patent No. 1160660); (3): the condensation reaction of an aromatic compound in the co-presence of sulfur chloride and Lewis acid catalyst (refer to Published Unexamined Japan Patent Application No. 46-27255, Belgium Patent No. 29437). Any such method may be selected according to the conditions and requirements.

While any ester-based compound having the structure shown in the preceding formulas (1) or (2) can be effectively used as an ingredient of the composition according to the present invention, that indicated in Formula (1) is preferable.

This compound may preferably be exemplified by fatty acid ester of polyhydric alcohol such that all of $R^1$ to $R^4$ in formula (1) are alkyl radicals and/or alkenyl radicals of 10–40 carbon atoms, preferably alkyl radicals of 15–35 carbon atoms. In Formula (1) m should preferably be 2.0–4.0.

The typical substance indicated in Formula (1) covers fatty acid ester of neopentyl polyol (e.g., higher fatty ester of neopentyl alcohol, neopentyl glycol, or pentaerythritol). Particularly preferable are stearic acid ester or montanic acid ester of dimer to quadrimer or their mixture of pentaerythritol.

Out of the compounds shown by Formula (2), phthalic acid ester where the number of carbon atoms of $R^5$ is more than 25, particularly 40-60, is preferable. If the number of carbon atoms of $R^5$ is less than 25, the mechanical strength of PAS resin is markedly reduced. The ester-based compounds related to this invention as shown in the above-stated formulas (1) and (2) are preferably use in the amounts of 0.01 to 6 wt. pts. of PAS resin to completely achieve the purpose of the invention, achieving good mechanical properties in the composition.

To the composition of this invention can be added reinforcing fibers, preferably glass fibers and carbon fibers and/or other inorganic fillers. The glass fiber to be used is preferably such that element wires made of alkali-free glass fibers having a diameter of 5–20 and μm and are surface-treated with a silane coupling agent and an organic material called binder for bundling and cut in lengths of 3–6 mm. While the carbon fibers may be based on either of polyacrylonitrile or pitch, their element wires preferably have a diameter of 5–20 and μm and are surface-treated with epoxy-based resin nylon-based resin, or are left untreated.

Other inorganic fillers that can be used in the composition include calcium carbonate, talc, kaolin, clay, mica, wollastonite, calcium sulfate, silica, glass beads, milled glass fibers, milled carbon fibers, titanium oxide, graphite, and processed mineral fibers.

The quantitative proportion of these reinforcing fibers and other inorganic fillers is preferably 20–70 wt. % of the whole resin composition. In this case, the reinforcing fibrous material and other inorganic fillers can be used singly or jointly.

The composition related to this invention can have added, to any extent not hampering the aims of the invention, one or more thermoplastic resins—for example, polyphenylene ether, polyacetal, polyarylate, teflon resin, polyamide, polycarbonate, polysulfone, polyethersulfone, polyetherketone, polybutylene terephthalate, polyethylene terephathalate, polyamide imide, polyetherimide, polyethylene, polypropylene, and epoxyresin.

Fatty acid esters may be added to PAS resin in this invention using publicly known methods, wherein, for example, powdery or pelleted PAS resin and powdery, flakey, granular, or pelleted fatty acid ester, if required, together with a reinforcing agent such as glass-fiber and/or other inorganic fillers such as calcium carbonate, are preliminarily mixed mechanically and uniformly in a mixer such as drum tumbler and subjected to heating, melting and kneading processes in a screw type single/dual axis kneading/excluding machine; this is followed by cooling and pelletting.

To the composition of the present invention may be added small amounts of coloring material, heat-resistant stabilizer, UV stabilizer, rust preventives, crystal nucleating agents, and organic silane compounds as reforming agents to any extent that fulfills the purpose of the present invention.

The composition of this invention is used for various molding materials such as those for instrument parts in electrical, electronic, automobile, and chemical applications.

DETAILED DESCRIPTION OF PREFERRED EMBODIMENTS

The invention is explained in detail with reference to the following embodiments, though the invention is not limited in extent by these embodiments. It should be noted that parts are represented by weight.

Embodiment 1-6

Powdery PPS resin merchandised from Phillips Petroleum Inc. U.S.A. under the trade name of RYTON "p-4" is mixed with various additive compounds at the ratios shown in Table 1 to obtain a total weight 6 kg. The mixture is then put into 30-liter tumbler and is uniformly mixed at a speed of 80 rpm for about one minute. Sixty weight-percent of the above mixture fed at a rate of 15 kg/h and 40 wt. % chopped glass fiber (trade name: glassron chopped strand "CS-03-MA-497" made by Asahi fiber glass Co., Ltd.) fed at a rate of 10 kg/h are fed separately into a high-speed unidirectional biaxial kneading and extruding machine (Toshiba Machining Corporation, Ltd. TEM-35B) having a screw diameter of 37 mm, L/D=32, and a bend in order to be kneaded in the conditions that the cylinder temperature is 320° C., screw rotation is 250 rpm, and the discharge rate is 25 kg/h. Next, the mixture is discharged through a nozzle with a bore diameter of 3.6 mm, air-cooled, and finally cut into pellets 3 mm long by means of a strand cutter.

Molding was performed using a metal mold having a cylindrical cavity whose external diameter, internal diameter, and length are 30 mm, 28 mm, and 10 mm, respectively and whose LVS is one degree. The mold is mounted on a Sumitomo-Nestal injection molding machine, Model SAYCAP S165/75, with a maximum clamping force of 75 tons, and manufactured by Sumitomo Heavy Industries Ltd. The metallic mold temperature is 150° C.; the cylinder temperature of the molding machine is 320° C.; the injection speed is 30 mm/s; the primary injection pressure is 35 kgf/cm$^2$; the secondary injection pressure is 28 kgf/cm$^2$; the injection-pressurizing time is 3s (primary) and 3s (secondary); and the cooling time is 15 s. The amount of gas generated under these conditions was visually determined. The mold separating force working on the protruding pin was measured in the process in which the mold is opened and protruded after the cooling process finished using a pressure sensor (#9221, manufactured by KISTLER Ltd, Switzerland) mounted on one of three protruding pins each having a diameter of 1 mm. The mechanical strength was obtained by measuring the bending characteristic in compliance with ASTMD 790. The results are shown in Table 1. At this time of injection molding, the amount of gas generated was less than that in the following embodiments 7-12 and 13-18.

Embodiment 7-12

Various additives were compounded with PPS resin to prepare the corresponding compositions in a pellet form as in Embodiments 1-6. These samples were subjected to tests similar to those in Embodiments 1-6. The results are shown in Table 2.

Embodiments 13-18

Various additives were compounded with PPS resin to prepare the corresponding compositions in a pellet form as in Embodiments 1-6. These samples were subjected to tests similar to those in Embodiments 1-6. The results are shown in Table 3.

EXAMPLE FOR COMPARISON 1-6

Various additives were compounded with PPS resin to prepare the corresponding compositions in a pellet form as in Embodiments 1-6. These samples were subjected to tests similar to those in Embodiments 1-6. The results are shown in Table 4.

TABLE 1

| | Additive | | Bending characteristics | | Dependence of model resistor on metal mold temperature kgf/cm$^2$ | | | | Gas generated during injection molding |
|---|---|---|---|---|---|---|---|---|---|
| | Species | Addition wt. % | Strength kgf/cm$^2$ | Fracture elongation % | 60° C. | 90° C. | 120° C. | 150° C. | |
| Embodiment 1 | DPET-M | 0.3 | 2450 | 2.15 | 15 | 10 | 5 | 3 | Little |
| Embodiment 2 | PPET-M | 0.3 | 2450 | 2.16 | 15 | 9 | 3 | 3 | Little |
| Embodiment 3 | DPET-S | 0.3 | 2430 | 2.10 | 20 | 13 | 5 | 5 | Little |
| Embodiment 4 | DPET-S | 1.0 | 2430 | 2.12 | 15 | 10 | 5 | 3 | Little |
| Embodiment 5 | PPET-S | 0.3 | 2450 | 2.15 | 18 | 10 | 4 | 3 | Little |
| Embodiment 6 | PPET-S | 1.0 | 2440 | 2.14 | 12 | 8 | 4 | 3 | Little |

Composition of ingredients in mixture

| Name of compound (additive) | % |
|---|---|
| PPS; RYTON P-4 | 60-X |
| GF; CS-03-MA-497 | 40 |
| Additive | X |

DPET-M: Abbreviation for dipentaerythritol hexamontanate m = 2.0
PPET-M: Abbreviation for polypentaerythritol montante m = 3.4 (Esterification factor of montanic acid: 70%)
DPET-S: Abbreviation for dipentaerythritol hexastearate m = 2.0
PPET-S: Abbreviation for polypentaerythritol stearate m = 3.4 (Esterification factor of stearic acid: 70%)

TABLE 2

| | Additive | | Bending characteristics | | Dependence of model resistor on metal mold temperature kgf/cm$^2$ | | | | Gas generated during injection molding |
|---|---|---|---|---|---|---|---|---|---|
| | Species | Addition wt. % | Strength kgf/cm$^2$ | Fracture elongation % | 60° C. | 90° C. | 120° C. | 150° C. | |
| Embodiment 7 | Fatty acid ester ① | 0.3 | 2490 | 2.09 | 35 | 25 | 15 | 10 | Little |
| Embodiment 8 | Fatty acid ester ① | 1.0 | 2430 | 2.04 | 30 | 20 | 10 | 10 | Little |
| Embodiment 9 | Fatty acid ester ① | 3.0 | 2370 | 1.99 | 25 | 15 | 10 | 5 | Little |
| Embodiment 10 | Fatty acid ester ② | 0.3 | 2500 | 2.11 | 30 | 20 | 15 | 8 | Little |

TABLE 2-continued

| | Additive | | Bending characteristics | | Dependence of model resistor on metal mold temperature kgf/cm² | | | | Gas generated during injection molding |
|---|---|---|---|---|---|---|---|---|---|
| | Species | Addition wt. % | Strength kgf/cm² | Fracture elongation % | 60° C. | 90° C. | 120° C. | 150° C. | |
| Embodiment 11 | Fatty acid ester ② | 1.0 | 2430 | 2.08 | 25 | 15 | 8 | 5 | Little |
| Embodiment 12 | Fatty acid ester ② | 3.0 | 2380 | 2.00 | 20 | 10 | 5 | 3 | Little |

Composition of ingredients in mixture
Name of compound (additive)    %
PPS; RYTON P-4    60-X
GF; CS-03-MA-497    40
Additive    X
Fatty acid ester ①: methyltripropanol stearic acid ester
Fatty acid ester ②: methyltripropanol montanic acid ester

TABLE 3

| | Additive | | Bending characteristics | | Dependence of model resistor on metal mold temperature kgf/cm² | | | | Gas generated during injection molding |
|---|---|---|---|---|---|---|---|---|---|
| | Species | Addition wt. % | Strength kgf/cm² | Fracture elongation % | 60° C. | 90° C. | 120° C. | 150° C. | |
| Embodiment 13 | Long-chain alcohol phtalic acid ester ① | 0.3 | 2480 | 2.08 | 25 | 15 | 8 | 5 | Little |
| Embodiment 14 | Long-chain alcohol phtalic acid ester ① | 1.0 | 2450 | 2.03 | 20 | 10 | 5 | 3 | Little |
| Embodiment 15 | Long-chain alcohol phtalic acid ester ① | 3.0 | 2370 | 1.99 | 13 | 8 | 5 | 3 | Little |
| Embodiment 16 | Long-chain alcohol phtalic acid ester ② | 0.3 | 2500 | 2.12 | 23 | 13 | 8 | 5 | Little |
| Embodiment 17 | Long-chain alcohol phtalic acid ester ② | 1.0 | 2480 | 2.08 | 18 | 8 | 5 | 3 | Little |
| Embodiment 18 | Long-chain alcohol phtalic acid ester ② | 3.0 | 2400 | 2.00 | 11 | 5 | 3 | 3 | Little |

Composition of ingredients in mixture
Name of compound (additive)    %
PPS; RYTON P-4    60-X
GF; CS-03-MA-497    40
Additive    X
Long-chain alcohol phtalic acid ester ①: n = 28~32
Long-chain alcohol phtalic acid ester ②: n = 48~52

TABLE 4

| | Additive | | Bending characteristics | | Dependence of model resistor on metal mold temperature kgf/cm² | | | | Gas generated during injection molding |
|---|---|---|---|---|---|---|---|---|---|
| | Species | Addition wt. % | Strength kgf/cm² | Fracture elongation % | 60° C. | 90° C. | 120° C. | 150° C. | |
| Example for comparison 1 | Not added | — | 2480 | 2.04 | >500 | >500 | >500 | >500 | Little |
| Example for comparison 2 | Zinc stearate | 0.3 | 2140 | 1.90 | 200 | 150 | 110 | 95 | Much |
| Example for comparison 3 | Olefin wax | 3.0 | 2410 | 2.03 | 160 | 110 | 70 | 60 | Little |
| Example for comparison 4 | Ester wax | 0.3 | 2200 | 1.90 | 135 | 85 | 35 | 30 | Much |
| Example for comparison 5 | PETS | 0.3 | 2120 | 1.78 | 55 | 40 | 20 | 10 | Much |
| Example for comparison 6 | PETS | 1.0 | 2060 | 1.74 | 50 | 35 | 13 | 8 | Much |

Composition of ingredients in mixture
Name of compound (additive)    %
PPS; RYTON P-4    60-X
GF; CS-03-MA-497    40
Additive    X
Olefin wax: polyethylene wax
Ester wax: Montanic acid ethylene glycol ester wax
PETS: Abbreviation of pentaerythritol tetrastearate

Embodiments 19-24

Pellet samples of the composition prepared by adding various additives in the similar manner as in Embodiment 1 according to the mixing ratios shown in Table 5 were subjected to a molding process wherein a metallic mold having a sheet-type cavity of L=100 mm, D=25 mm, and t=1.6 mm is mounted on an injection molding machine (IS-50AM) with a clamping force of 50 tons (manufactured by Toshiba Machine Co., Ltd.). The pellet samples are molded under the following conditions: metallic mold temperature: 150° C.; cylinder temperature of the molding machine: 320° C.; injection pressure: 800 kgf/cm²; injection time: 8s; and cooling time: 15s. The adhesive strength was then measured in accordance with JIS K 6856. The mechanical strength was measured by determining the bending characteristics in according with ASTM D 790. Molding flow length was determined by mounting a metallic mold with a 6.3×1.6 mmt cavity mounted on an injection molding machine (IS-50AM) with a clamping force of 50 tons manufactured by Toshiba Machine Co., Ltd) and by measuring spiral flow under the following conditions: metallic mold temperature: 150° C.; cylinder temperature in the molding machine: 320° C.; injection pressure: 980 kg/cm²; injection time: 5s; and cooling time 15s. In addition, the surface wettability on the above-mentioned molding sheet was measured in terms of the contact angle for water 30s after touching by means of an Elmer goniometer contact-angle measuring instrument (model G-I) for room-temperature application. The results are shown in Table 5.

Embodiment 25-28

Various additives were compounded with PPS resin to prepare corresponding compositions in a pellet form as in Embodiments 19-24. These samples were subjected to tests similar to those in Embodiments 19-24. The results are shown in Table 6.

EXAMPLE FOR COMPARISON 7-13

Various additives were compounded with PPS resin to prepare corresponding compositions in a pellet form as in Embodiments 17-24. These samples were subjected to tests similar to those in the Embodiments 19-24. The results are shown in Table 7.

TABLE 5

| | Additive compound | | Bending characteristics | | Adhesive strength (kgf) by species of adhesive | | Spiral flow characteristic cm | Wettability of surface in terms of contact angle: degree |
|---|---|---|---|---|---|---|---|---|
| | Species | Addition wt. % | Strength kgf/cm² | Fracture elongation % | Silicone adhesive | Epoxy adhesive | | |
| Embodiment 7 | DPET-M | 0.5 | 2430 | 2.15 | 68 | 68 | 65 | 53 |
| Embodiment 8 | PPET-M | 0.5 | 2440 | 2.16 | 70 | 68 | 53 | 57 |
| Embodiment 9 | DPET-S | 0.2 | 2460 | 2.12 | 60 | 63 | 51 | 60 |
| Embodiment 10 | DPET-S | 0.5 | 2430 | 2.11 | 65 | 65 | 53 | 59 |
| Embodiment 11 | PPET-S | 0.2 | 2470 | 2.15 | 60 | 65 | 50 | 60 |
| Embodiment 12 | PPET-S | 0.5 | 2450 | 2.15 | 68 | 65 | 53 | 58 |

Mixing percentage of ingredients
Name of compound %
PPS; RYTON P-4   60-X
GF; CS-03-MA-497   40
Additive compound   X
DPET-M: Abbreviation for dipentaerythritol hexamontanate n = 2.0
PPET-M: Abbreviation for polypentaerythritol montante n = 3.4 (Esterification factor of montanic acid: 70%)
DPET-S: Abbreviation for dipentaerythritol hexastearate n = 2.0
PPET-S: Abbreviation for polypentaerythritol stearate n = 3.4 (Esterification factor of stearic acid: 70%)

TABLE 6

| | Additive compound | | Bending characteristics | | Adhesive strength (kgf) by species of adhesive | | Spiral flow characteristic cm | Wettability of surface in terms of contact angle: degree |
|---|---|---|---|---|---|---|---|---|
| | Species | Addition wt. % | Strength kgf/cm² | Fracture elongation % | Silicone adhesive | Epoxy adhesive | | |
| Embodiment 7 | Fatty acid ester ① | 0.2 | 2490 | 2.09 | 62 | 50 | 65 | 53 |
| Embodiment 8 | Fatty acid ester ② | 0.5 | 2500 | 2.11 | 60 | 58 | 52 | 60 |
| Embodiment 9 | Phthalic acid ester of long-chain alcohol ① | 0.2 | 2480 | 2.08 | 62 | 60 | 50 | 60 |
| Embodiment 10 | Phthalic acid ester of long-chain alcohol ② | 0.5 | 2500 | 2.10 | 60 | 58 | 52 | 60 |

Mixing percentage of ingredients
Name of compound %
PPS; RYTON P-4   60-X
GF; CS-03-MA-497   40
Additive compound   X
Fatty acid ester ①: methyltripropanolstearic acid ester m = 18
Fatty acid ester ②: methyltripropanolmontanic acid ester m = 30
Long-chain alcohol phtalic acid ester ①: n = 28~32
Long-chain alcohol phtalic acid ester ②: n = 48~52

TABLE 7

| | Additive compound | | Bending characteristics | | Adhesive strength (kgf) by species of adhesive | | Spiral flow characteristic cm | Wettability of surface in terms of contact angle: degree |
|---|---|---|---|---|---|---|---|---|
| | Species | Addition wt. % | Strength kgf/cm² | Fracture elongation % | Silicone adhesive | Epoxy adhesive | | |
| Example for comparison 7 | Epoxy resin | 1.0 | 2100 | 1.89 | 35 | 40 | 42 | 68 |
| Example for comparison 8 | Silane compound | 0.2 | 2400 | 2.05 | 20 | 25 | 46 | 74 |
| Example for comparison | Silane compound | 0.5 | 2450 | 2.02 | 30 | 30 | 43 | 70 |

TABLE 7-continued

| | Additive compound | | Bending characteristics | | Adhesive strength (kgf) by species of adhesive | | Spiral flow characteristic cm | Wettability of surface in terms of contact angle: degree |
|---|---|---|---|---|---|---|---|---|
| | Species | Addition wt. % | Strength kgf/cm$^2$ | Fracture elongation % | Silicone adhesive | Epoxy adhesive | | |
| Example for comparison 9 | | | | | | | | |
| Example for comparison 10 | Zinc stearate | 0.5 | 2090 | 1.87 | 40 | 40 | 49 | 63 |
| Example for comparison 11 | Olefine wax | 0.5 | 2380 | 2.00 | 25 | 25 | 52 | 75 |
| Example for comparison 12 | PETS | 0.2 | 2150 | 1.80 | 30 | 30 | 50 | 70 |
| Example for comparison 13 | PETS | 0.2 | 2100 | 1.75 | 40 | 35 | 52 | 68 |

Mixing percentage of ingredients
Name of compound     %
PPS; RYTON P-4      60-X
GF; CS-03-MA-497    40
Additive compound    X
Epoxy resin: Dainippon Ink & Chemicals, Inc. "Epikuron 7050"
Silane compound: Epoxysilane (Nippon yunika K.K. "NUC silane coupling agent A-187")
Olefine wax: Polyethylene wax
PETS: Abbreviation of pentaerythritol tetrastearate
Silicone adhesive: Toshiba Silicone TSE-322 (Hardening condition = 135° C./30 min)
Epoxy adhesive: Dainippon Ink & Chemicals, Inc. "Two-component adhesive <Epiklon 850/Lacamide EA240=50/50>"
Hardening condition = 23° C. for 1 h and 100° C. for 1 h)

We claim:

1. A polyarylene sulfide resin composition characterized in being manufactured by compounding polyarylenesulfide resin with at least one ester-based compound selected from the groups of compounds shown in the following formulas (1) and (2):

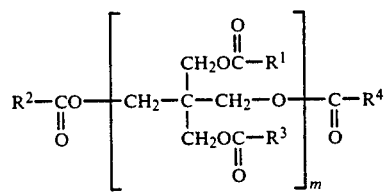

where $R^1$ and $R^4$ are such that at least one of them is an alkyl or alkenyl group of 10–40 carbon atoms, the remaining Rs represent —H, —OH, alkyl, or aryl radicals, and $2.0 \leq m < 6.0$,

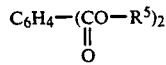

wherein $R^5$ is $C_nH_{2n+1}$, and $40 \leq n \leq 70$.

2. A composition described in claim 1, the ester-based compound being at least one ester-based compound selected from a group consisting of polyhydric alcohol fatty acid ester such that all of $R^1$ to $R^4$ are selected from alkyl and alkenyl radicals of 15-35 carbon atoms in Formula (1); and phthalic acid ester such that the number of carbon atoms in $R^5$ is 40-60 in Formula (2).

3. A composition described in claim 2 wherein 0.01-6 wt.pts ester-based compound is compounded with 100 wt.pts. polyarylenesulfide resin.

4. A composition described in claim 1, the ester-based compound being a fatty acid ester of polyhydric alcohol shown in Formula (1).

5. A composition described in claim 1, the ester-based compound being shown by Formula (1) and being a polyhydric alcohol fatty acid ester wherein all of $R^1$ to $R^4$ are alkyl radicals of 15-35 carbon atoms and m is 2.0 to 4.0.

6. A composition described in claim 1, the ester-based compound being a fatty acid ester of neopentyl polyol.

7. A composition described in claim 1 wherein the ester-based compound is at least one ester-based compound selected from a group consisting of stearic acid ester and montanic acid ester of any one or a mixture of dimer to tetramer of pentaerythritol.

8. A composition described in claims, 4, 5, 6 or 7 wherein 0.01-6 wt.pts. of the ester-based compound is compounded with 100 wt.pts. polyarylenesulfide resin.

9. A composition described in any one of claims 1-7, the composition further including a fiber reinforcement agent.

10. A composition described in claim 9 wherein the fiber reinforcement agent is selected from the group composed of glass fibers, carbon fibers and other inorganic fillers.

11. A composition described in claim 8, the composition including further a fiber reinforcement agent.

12. A composition described in claim 11, the fiber reinforcement agent being selected from the group composed of glass fibers, carbon fibers and other inorganic fillers.

* * * * *